United States Patent
Wu

(10) Patent No.: US 8,742,731 B2
(45) Date of Patent: Jun. 3, 2014

(54) VOLTAGE CONVERSION CIRCUIT AND CHARGING DEVICE EMPLOYING THE SAME

(75) Inventor: Hai-Zhou Wu, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 804 days.

(21) Appl. No.: 13/010,791

(22) Filed: Jan. 21, 2011

(65) Prior Publication Data

US 2012/0139478 A1    Jun. 7, 2012

(30) Foreign Application Priority Data

Dec. 3, 2010  (CN) .......................... 2010 1 0572417

(51) Int. Cl.
*H02J 7/00*    (2006.01)
(52) U.S. Cl.
USPC .......................................... 320/162; 320/107
(58) Field of Classification Search
USPC ................................................ 320/107, 162
See application file for complete search history.

(56) References Cited

U.S. PATENT DOCUMENTS

| | | | | |
|---|---|---|---|---|
| 4,760,322 A | * | 7/1988 | Crampton | 320/128 |
| 5,589,757 A | * | 12/1996 | Klang | 320/160 |
| 8,035,346 B2 | * | 10/2011 | Tsai | 320/136 |
| 8,552,691 B2 | * | 10/2013 | Wu | 320/137 |
| 2005/0093509 A1 | * | 5/2005 | Liang | 320/114 |
| 2009/0001935 A1 | * | 1/2009 | Odaohhara | 320/134 |
| 2011/0148358 A1 | * | 6/2011 | Lee | 320/114 |

* cited by examiner

*Primary Examiner* — Samuel Berhanu
(74) *Attorney, Agent, or Firm* — Novak Druce Connolly Bove + Quigg LLP

(57) ABSTRACT

A voltage conversion circuit for a charging device includes a voltage-stabilizing circuit and a switching circuit. The voltage-stabilizing circuit includes a voltage stabilizer circuit and a feedback resistor, the voltage stabilizer circuit comprises an input pin, an output pin, and a feedback pin. The switching circuit includes a switch and at least two divider resistors, the switch comprises at least two data input terminals, a data output terminal, and two control terminals. The input pin is connected to a power source, and the feedback resistor is connected between the feedback pin and ground. The data input terminals are respectively connected to the output pin through one of the divider resistors, the data output terminal is connected between the feedback pin and the feedback resistor, the two control terminals are capable of receiving control signals to control the data output terminal to selectively connect to one of the data input terminals.

16 Claims, 2 Drawing Sheets

VOLTAGE CONVERSION CIRCUIT AND CHARGING DEVICE EMPLOYING THE SAME

BACKGROUND

1. Technical Field

The disclosure generally relates to voltage conversion circuits, and more particularly relates to a voltage conversion circuit used in a charging device.

2. Description of the Related Art

Portable electronic devices such as a mobile phone often have a universal serial bus (USB) interface for charging. When a battery of the portable electronic device needs to be charged, a USB cable is connected between the USB interface of the portable electronic device and a USB interface of a computer, then a charge current from the computer can charge the battery through a over voltage protection circuit and a charging circuit. However, due to restrictions of the USB protocol, the charge current is usually no more than 500 mA. Actually, the charge current is only about 450 mA considering a variety of errors. However, charge current can be about 1000 mA by using a traditional mobile phone charger, so charge efficiency is lower by using the USB interface, and users must spend more time charging compared with using a traditional mobile phone charger.

Therefore, there is room for improvement within the art.

BRIEF DESCRIPTION OF THE DRAWINGS

Many aspects of an exemplary voltage conversion circuit and a charging device employing the same can be better understood with reference to the following drawings. The components in the drawings are not necessarily drawn to scale, the emphasis instead being placed upon clearly illustrating the principles of the exemplary charging circuit. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
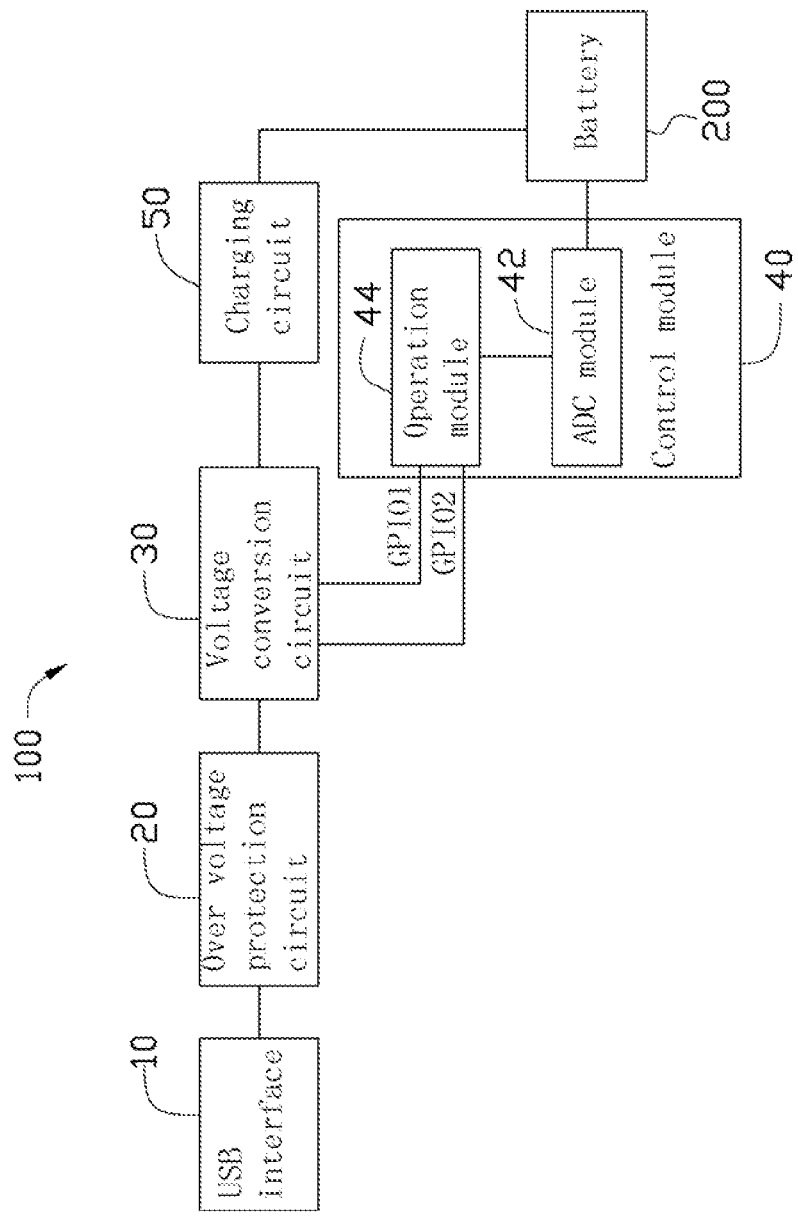
FIG. 1 is a block diagram of a charging device comprising a voltage conversion circuit, according to an exemplary embodiment.

FIG. 1 is a block diagram of a charging device 100 comprising a voltage conversion circuit 30, according to an exemplary embodiment. The charging device 100 is capable of charging a battery 200 of a portable electronic device (not shown) through a USB cable. The charging device 100 further includes a USB interface 10 of the portable electronic device, an over voltage protection circuit 20, a control module 40, and a charging circuit 50.

The USB interface 10 can be connected to a computer via the USB cable for obtaining current. Alternatively, the USB interface 10 can be connected to a power adapter.

The over voltage protection circuit 20 is electronically connected between the USB interface 10 and the voltage conversion circuit 30. When the output voltage of the USB interface 10 is higher than a predetermined voltage, the over voltage protection circuit 20 can automatically cut off the flow of voltage in order to protect the charging device 100 from over-voltage.

Figure 2:
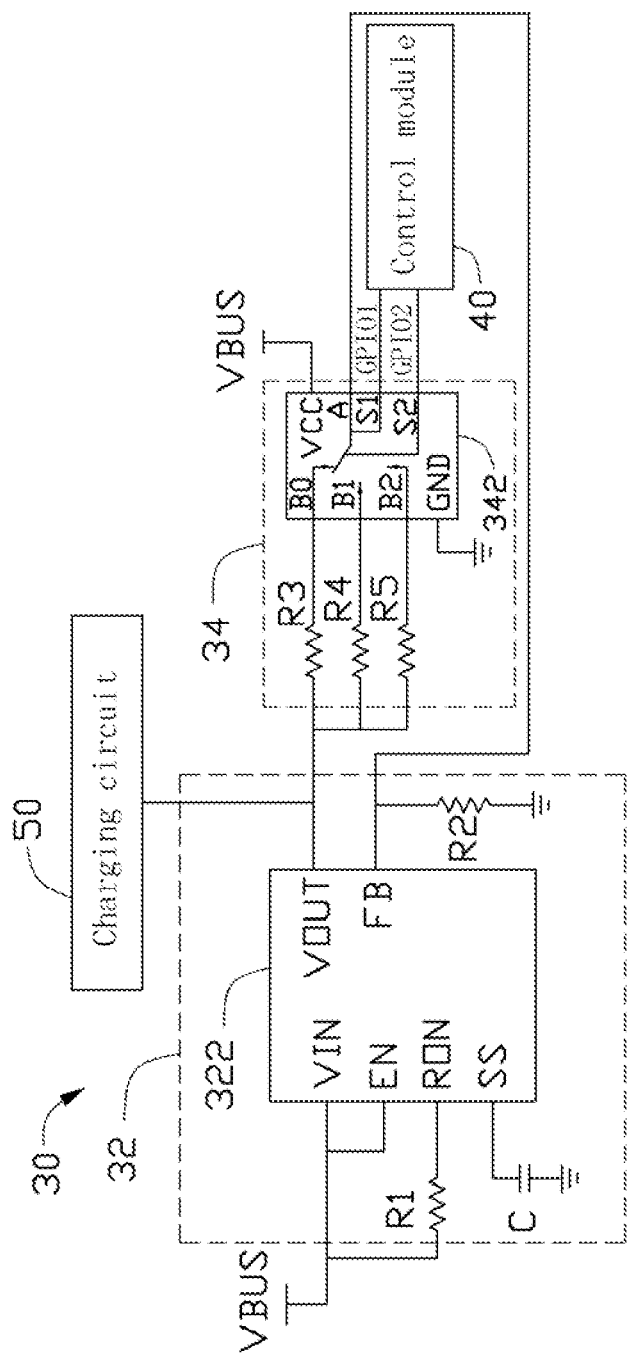
FIG. 2 is a circuit view of one embodiment of the voltage conversion circuit of FIG. 1.

Also referring to FIG. 2, the voltage conversion circuit 30 is electronically connected to the control module 40 and the charging circuit 50. The voltage conversion circuit 30 is operable to output different voltage in different periods to the charging circuit 50. The voltage conversion circuit 30 includes a voltage-stabilizing circuit 32 and a switching circuit 34 electronically connected to the voltage-stabilizing circuit 32.

The voltage-stabilizing circuit 32 includes a voltage stabilizer circuit 322, a timing resistor R1, a capacitor C, and a feedback resistor R2. The voltage stabilizer circuit 322 has a predetermined reference voltage Vref. In this exemplary embodiment, the reference voltage Vref can be about 0.8V. The voltage stabilizer circuit 322 is capable of comparing the reference voltage Vref and a feedback voltage Vfb and generating a control signal to adjust the feedback voltage Vfb to supply steady current to the charging circuit 50. The voltage stabilizer circuit 322 includes an input pin VIN, an enable pin EN, a timing pin RON, a soft start pin SS, an output pin VOUT, and a feedback pin FB. The input pin VIN and the enable pin EN are electronically connected to a power terminal VBUS of the USB interface 10 to get power to function the voltage stabilizer circuit 322. The timing resistor R1 is electronically connected between the timing pin RON and the input pin VIN. The capacitor C is electronically connected between the soft start pin SS and ground to produce a soft-start delay function. The output pin VOUT is connected to the charging circuit 50. The feedback resistor R2 is connected between the feedback pin FB and ground. In this exemplary embodiment, the feedback resistor R2 can be about 100 k ohms.

The switching circuit 34 is capable of controlling the voltage-stabilizing circuit 32 to output different voltage in different periods. The switching circuit 34 includes a switch 342, three divider resistors R3, R4, and R5. The switch 342 can be a single-pole triple-throw analog switch, which includes a power supply terminal VCC, three data input terminals B0, B1, and B2, a data output terminal A, two control terminals S1 and S2, and ground terminal GND. The power terminal VCC is electronically connected to the power terminal VBUS of the USB interface 10 to get power. The three data input terminals B0, B1, and B2 are connected to the output pin VOUT of the voltage stabilizer circuit 322 respectively through the divider resistors R3, R4, and R5. In this exemplary embodiment, the divider resistors R3, R4, and R5 can be about 390 k ohms, 470 k ohms, and 510 k ohms, respectively.

The data output terminal A is electronically connected to the feedback FB of the voltage stabilizer circuit 322 to feed the feedback voltage Vfb back to the voltage stabilizer circuit 322. The control terminals S1 and S2 are both electronically connected to the control module 40. By controlling of the control module 40, the data output terminal A can selectively connect to one of the data input terminals B0, B1, and B2. In use, the data output terminal A is electronically connected to the data input terminal B0 when the control terminals S1 and S2 are respectively set to logic 1 and logic 0. The data output terminal A is electronically connected to the data input terminal B1 when the control terminals S1 and S2 are respectively set to logic 0 and logic 1. The data output terminal A is electronically connected to the data input terminal B2 when the control terminals S1 and S2 are both set to logic 1.

The control module 40 can be a CPU of the portable electronic device, and is electronically connected to the battery 200. The control module 40 includes an ADC module 42, a operation module 44, two general purpose input output interfaces (GPIO) 1 and GPIO2. The ADC module 42 is capable of converting real-time voltage value of the battery 200 into digital signals. The operation module 44 is electronically connected to the ADC module 42 to control the GPIO1 and the GPIO2 according to the digital signals. In practice, the voltage range of the battery 200 is about 3-4.2V. Thus, In use, the GPIO1 and the GPIO 2 can respectively trigger on logic 1 and logic 0 when the voltage range of the battery 200 is about 3-3.5V, the GPIO1 and the GPIO 2 can respectively trigger on logic 0 and logic 1 when the voltage range of the battery 200 is about 3.5-4.0V, and the GPIO1 and the GPIO 2 can both trigger on logic 1 when the voltage range of the battery 200 is about 4.0-4.2V. The GPIO1 and the GPIO 2 are respectively and electronically connected to the control terminals S1 and S2 for further controlling the data output terminal A of the switch 342.

The charging circuit 50 is electronically connected between the output pin VOUT of the voltage-stabilizing circuit 32 and the battery 200. The charging circuit 50 is capable of transmitting current from the output pin VOUT to the battery 200 for charging.

When an initial voltage range of the battery 200 is about 3-3.5V, the charging device 100 can be used to charge the battery 200. Firstly, the ADC module 42 converts the voltage value of the battery 200 into a digital signal, and the operation module 44 controls the GPIO1 and the GPIO2 respectively to trigger on logic 1 and logic 0. Then the control terminals S1 and S2 of the switch 342 are respectively set to logic 1 and logic 0, and the data output terminal A is electronically connected to data input terminal B0. Then, the current passes through the USB interface 10, the over voltage protection circuit 20, the output pin VOUT, the divider resistor R3, and the data output terminal A, and then the data output terminal A feeds the feedback voltage Vfb back to the feedback pin FB. The voltage stabilizer circuit 322 compares the feedback voltage Vfb and the reference voltage Vref, and adjusts the voltage of the output pin VOUT until the feedback voltage Vfb is equal to the reference voltage Vref. As a result, the output pin VOUT outputs steady current to the charging circuit 50. In this exemplary embodiment, the input voltage of the voltage stabilizer circuit 322 is about 5V, the input current of the voltage stabilizer circuit 322 is about 500 mA, and the efficiency of the voltage stabilizer circuit 322 is about 95%. Thus, the output voltage and the output current of the output pin VOUT can be calculated in this formula:

$$Vout = Vfb\frac{R3+R2}{R2} = Vref\frac{R3+R2}{R2} = 0.8 \text{ V} \times \frac{390+100}{100} = 3.92 \text{ V}$$

$$Iout = \frac{Pout}{Vout} = \frac{500 \text{ mA} \times 5 \text{ }V \times 0.95}{3.92 \text{ }V} = 605 \text{ mA}$$

When the voltage of the battery 200 is gradually increased to 3.5-4.0V, the operation module controls the GPIO1 and the GPIO2 respectively to trigger on logic 0 and logic 1. Then the control terminal S1 and S2 of the switch 342 are respectively set to logic 0 and logic 1, and the data output terminal A is electronically connected to data input terminal B1. Thus, the output voltage and the output current of the output pin VOUT can be calculated in this formula:

$$Vout = Vfb\frac{R4+R2}{R2} = Vref\frac{R4+R2}{R2} = 0.8 \text{ V} \times \frac{470+100}{100} = 4.56 \text{ V}$$

$$Iout = \frac{Pout}{Vout} = \frac{500 \text{ mA} \times 5 \text{ }V \times 0.95}{4.56 \text{ V}} = 520 \text{ mA}$$

Similarly, when the voltage of the battery 200 is gradually increased to 4.0-4.2V, the data output terminal A is electronically connected to data input terminal B2. Thus, the output voltage and the output current of the output pin VOUT can be calculated in this formula:

$$Vout = Vfb\frac{R5+R2}{R2} = Vref\frac{R5+R2}{R2} = 0.8 \text{ V} \times \frac{510+100}{100} = 4.88 \text{ V}$$

$$Iout = \frac{Pout}{Vout} = \frac{500 \text{ mA} \times 5 \text{ }V \times 0.95}{4.88} = 486 \text{ mA}$$

Obviously, in the three charge periods, the charge current are all improved compare with the traditional charge current (450 mA) using the USB interface. Thus, the charging device 100 can improve the charge efficiency and save time.

In other embodiments, the value of resistors R2-R5 in the above-described can be changed.

In other embodiments, one of the three divider resistors R3-R5 can be omitted, and the switch 342 can be a single-pole double-throw analog switch, correspondingly.

The charging device 100 can check the real-time voltage of the battery 200 by the control module 40, and then the voltage conversion circuit 30 can output different voltage in different periods. The maximum charge current of the charging device 100 can be reached about 605 mA, thus the charging device 100 can improve the charging efficiency and save charge time.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A voltage conversion circuit, comprising:
   a voltage-stabilizing circuit including a voltage stabilizer circuit and a feedback resistor, the voltage stabilizer circuit comprising an input pin, an output pin, and a feedback pin; and
   a switching circuit including a switch and at least two divider resistors, the switch comprising at least two data input terminals, a data output terminal, and two control terminals;
   wherein the input pin is connected to a power source, and the feedback resistor is connected between the feedback pin and ground, the data input terminals are respectively connected to the output pin through one of the divider resistors, the data output terminal is connected between the feedback pin and the feedback resistor, the two control terminals are capable of receiving control signals to control the data output terminal to selectively connect to one of the data input terminals.

2. The voltage conversion circuit as claimed in claim 1, wherein the output terminal is capable of feeding a feedback voltage back to the feedback pin.

3. The voltage conversion circuit as claimed in claim 2, wherein the output pin is operable to output steady current by adjusting the feedback voltage.

4. The voltage conversion circuit as claimed in claim 1, wherein the voltage-stabilizing circuit further includes a capacitor, the voltage stabilizer circuit comprises a soft start pin, the capacitor is connected between the soft start pin and ground to produce a soft-start delay function.

5. The voltage conversion circuit as claimed in claim 1, wherein the voltage-stabilizing circuit further includes a timing resistor, the voltage stabilizer circuit comprises a timing pin, the timing resistor is connected between the timing pin and the input pin.

6. The voltage conversion circuit as claimed in claim 1, wherein the voltage stabilizer circuit further includes an enable pin, the enable pin is connected to the power source to get power to function the voltage stabilizer circuit.

7. The voltage conversion circuit as claimed in claim 1, wherein the switch is a single-pole triple-throw analog switch.

8. A charging device for charging a battery of an electronic device by a USB interface of the electronic device, comprising:
a charging circuit connected to the battery;
a voltage conversion circuit including a voltage-stabilizing circuit and a switching circuit; and
a control module;
wherein the voltage-stabilizing circuit receives current from the USB interface, the switching circuit includes a switch and at least two divider resistors, the switch is connected to the voltage-stabilizing circuit through one of the divider resistors, the control module is connected to the switch and capable of controlling a data output terminal of the switch to connect to one of the divider resistors according to real-time voltage of the battery, and the data output terminal is capable of feeding voltage signals back to the voltage-stabilizing circuit so that the voltage-stabilizing circuit can output steady current to the charging circuit.

9. The charging device as claimed in claim 8, wherein the voltage-stabilizing circuit includes a voltage stabilizer circuit and a feedback resistor, the voltage stabilizer circuit includes a feedback pin, the feedback resistor is connected between the feedback pin and ground, and the data output terminal is connected between the feedback pin and ground.

10. The charging device as claimed in claim 8, wherein the voltage-stabilizing circuit includes a voltage stabilizer circuit, the stabilizer circuit includes an output pin, the switch includes at least two data input terminals, each data input terminal is connected to the output pin through one of the divider resistor.

11. The charging device as claimed in claim 10, wherein the switch includes two control terminals, the two control terminals are connected to the control module to control the data output terminal to connect to one of the data input terminals.

12. The charging device as claimed in claim 10, wherein the charging circuit is connected to the output pin of the voltage stabilizer circuit.

13. The charging device as claimed in claim 8, wherein the control module includes a ADC module, a operation module, and two GPIO interfaces, the ADC module is connected to the batter to convert the real-time voltage of the battery into digital signals, the operation module is connected to the ADC module to control the two GPIO interfaces to trigger on logic signals according to the digital signals.

14. The charging device as claimed in claim 13, wherein the switch include two control terminals, the two control terminals are respectively connected to the two GPIO interfaces for controlling the data output terminal of the switch.

15. The charging device as claimed in claim 8, wherein the charging device further includes an over voltage protection circuit, the over voltage protection circuit is connected between the USB interface and the voltage conversion circuit.

16. The charging device as claimed in claim 8, wherein the switch is a single-pole triple-throw analog switch.

\* \* \* \* \*